United States Patent
Hewitt et al.

(10) Patent No.: US 7,788,786 B2
(45) Date of Patent: Sep. 7, 2010

(54) METHOD FOR MOUNTING A BEARING ASSEMBLY ON A SHAFT

(75) Inventors: William Gregory Hewitt, Taylors, SC (US); Joseph J. Maloney, Greenwood, IN (US)

(73) Assignee: Baldor Electric Company, Fort Smith, AR (US)

( * ) Notice: Subject to any disclaimer, the term of this patent is extended or adjusted under 35 U.S.C. 154(b) by 755 days.

(21) Appl. No.: 11/515,630

(22) Filed: Sep. 5, 2006

(65) Prior Publication Data

US 2008/0056634 A1   Mar. 6, 2008

(51) Int. Cl.
*B23P 11/00* (2006.01)
*F16C 43/04* (2006.01)

(52) U.S. Cl. .............. 29/525.11; 29/898.07; 384/538; 384/559; 403/351

(58) Field of Classification Search .............. 29/898.07, 29/898.08, 525.11; 384/538, 539, 559, 563, 384/564, 571; 403/351
See application file for complete search history.

(56) References Cited

U.S. PATENT DOCUMENTS 4,978,236 A * 12/1990 Ostling .................. 384/480
5,779,419 A    7/1998 Kellström et al.
6,939,053 B2 * 9/2005 Nisley et al. ............. 384/538

OTHER PUBLICATIONS

Rockwell Automation; Dodge Dimensions; Imperial—IP Pillow Block; 33 pages.
Rockwell Automation; Dodge; Features/Benefits; Imperial; Patented Adapter System Offers Quick Installation and Removal, 3 pages.
Rockwell Automation; Dodge; Dodge Spherical Bearings; Imperial Bearings; website: http://www.dodge-pt.com/products/bearing/spherical/imperial_bearing.html; 2 pages.

* cited by examiner

*Primary Examiner*—David P Bryant
*Assistant Examiner*—Sarang Afzali
(74) *Attorney, Agent, or Firm*—Thompson Coburn LLP; Matthew J. Himich

(57) ABSTRACT

A mounting system is disclosed for mounting a bearing assembly or other mechanical element to a shaft. The mounting system uses a tapered sleeve mechanism to secure the bearing assembly on the shaft. Specifically, a plurality of screws point load the tapered sleeve and drive it from a pre-assembled position to an initial position. Once the initial position has been reached a plurality of fasteners then drive the sleeve from the initial position to a final position. The difference between the initial position and final position determined by the width of a removable spacer used in the mounting system. The system also incorporates a jack screw mechanism used to dismount the bearing assembly from the shaft.

5 Claims, 3 Drawing Sheets

METHOD FOR MOUNTING A BEARING ASSEMBLY ON A SHAFT

BACKGROUND

The present invention relates to the field of mechanically mounting an element to a shaft. More specifically, the invention relates to an innovative tapered sleeve system used to mount a bearing assembly or other mechanical element to a shaft.

Rotary mechanical systems include elements, such as bearings, that allow relative rotational movement between respective parts. For example, a rotary system might include a stationary housing that supports a rotating shaft via a bearing assembly. The bearing assembly is typically mounted directly to the shaft and allows for the relative rotational movement between the stationary housing and the rotating shaft.

A variety of mounting systems are known and commercially available for mounting a bearing assembly or other mechanical element to a shaft. Some of these systems make use of a tapered sleeve that fits snuggly between the outer periphery of the shaft and the inner ring of the bearing assembly. The tapered outside diameter of the sleeve engages the tapered inside diameter of the bearing assembly and causes the sleeve to enter into an interference fit with both the inner ring and the shaft. Variations of this type of arrangement may include multiple sleeves that alleviate the need for a taper either on the shaft or the bearing ring, as well as various mechanical arrangements for pressing or drawing the sleeve into tight engagement.

Those skilled in the art are familiar with the operation of this type of system and the limitations of using such systems. The first limitation relates to part tolerance and the initial clearance between these parts (i.e. the shaft outside diameter, the sleeve width, the inside diameter of the bearing assembly, etc). These are inherent in every mechanical system because each component is manufactured within some tolerance range and each assembly has some initial clearances to allow the user to assemble and initially position the parts. The user can eliminate this variable by assembling the parts to an initial position or "zero reference point" that represents the position where all of these tolerances and initial clearances between the parts have been removed. This initial position can be problematical in that, if not accurately established, it can lead to further assembly problems as discussed below. None of the current mounting systems have an easy, reliable, and consistent method to determine this initial position.

Besides the tolerance and initial clearance between all of the mating parts, bearing assemblies themselves have an initial internal clearance between the internal components of the bearing. Too much, and particularly too little internal clearance, such as resulting from overloading the internal ring, can result in damage to the bearing and eventual mechanical system failure. Tapered sleeve arrangements can overload bearings, effectively reducing the internal clearance by expanding the inner ring of the bearing. The problem with current systems is that it is hard to determine exactly how much inner ring expansion might occur during the assembly process. Some systems address this issue by requiring special tooling to determine the expansion of the inner ring. However, such special tooling is not always available in the field and can be expensive.

Another limitation of tapered sleeve mounting systems relates to the manner in which the tapered sleeve is driven or drawn into engagement between the bearing assembly and the shaft. Often in these type systems, a drive thread is used to urge the tapered sleeve into place. This drive thread is often incorporated into the outside diameter of the sleeve itself, thus requiring the thread to be no less then the shaft diameter. Because these systems can be used on very large shaft diameters (e.g., 10 inches and larger), the threads themselves must also be relatively large. Consequently, special tooling is often required to torque the larger components that engage the oversized threads. Again, such special tooling is not always readily available, can be very expensive. Furthermore, this tooling does not solve the problem of accurately determining the initial position.

A second issue is that large diameter threads have larger contacting areas and thus frictional losses are increased. These forces, when combined with the frictional forces of the tapered system itself result in very large moments that must be imparted on the components to thread the sleeve properly into engagement. Also, those skilled in the art will appreciate that the frictional force in this thread can vary greatly resulting in a great deal of uncertainty in the torque required to engage this thread. This is problematic because this torque value is often used to determine the initial position and/or fully engaged position. If this torque is not consistent, the user may incorrectly believe they have reached the initial position when they have not, or they may believe they have not reached the initial position when they have. Both of these undesirable results can lead to damage to the bearing and/or mechanical system failure.

Another limitation in these mounting systems is that not only is special tooling required to install the bearing, it is also required to remove the bearing from the shaft. As discussed above, the tapered sleeve is driven into the bearing assembly using a drive mechanism that can expand the inner race of the bearing, creating a contact stress between the parts. This contact stress can be very high and requires a great deal of force to disengage the sleeve from the bearing, such as for servicing the equipment. Some mounting systems use special tooling, a hydraulic ram for instance, to overcome this force or require the user to physically overcome this force. As discussed above, this tooling can be expensive, complex to use, or may be simply unavailable in a location where the disassembly might occur.

There is a need in the art for techniques for securing rotating components, particularly bearings and shafts that alleviate or address at least some of these drawbacks of existing technology. There is a particular need for an approach in the assembly of sleeve systems that allows for accurate judgment of initial and final engagement of a sleeve between a bearing and a shaft, or between any two concentrically mating elements.

BRIEF DESCRIPTION

The present invention offers a novel approach that addresses some or all of the issues and problems discussed above. In one implementation, the invention may generally include an internal flange, an external flange, a tapered sleeve, and a plurality of fasteners. The system mounts a bearing assembly to a shaft by driving the tapered sleeve into the assembly via an innovative drive system. The drive system is incorporated into the parts and eliminates the need for custom fixturing or special tooling. Unlike other mounting systems that make use of a single large diameter drive thread, the present invention uses a plurality of screws to point load the sleeve. This loading system reduces the frictional loses in the drive mechanism and does not require the user to overcome an excessive amount of drive thread resistance. This also has the very important benefit of allowing the user to accurately determine and reliable quantify an initial position of the sleeve as it is driven into engagement Once the initial position is determined, a plurality of fasteners may then press the sleeve to the final position. The present invention may use a removable spacer to accurately determine the proper distance between the initial position and final position of the sleeve. The width of the spacer may equal to the amount of sleeve movement required to properly engage the sleeve.

In certain embodiments, the fasteners may also be used to disassemble the system via a jack screw mechanism incorporated into the parts. The drive mechanism may remain in place during system operation, ensuring that the sleeve does not disengage the bearing.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
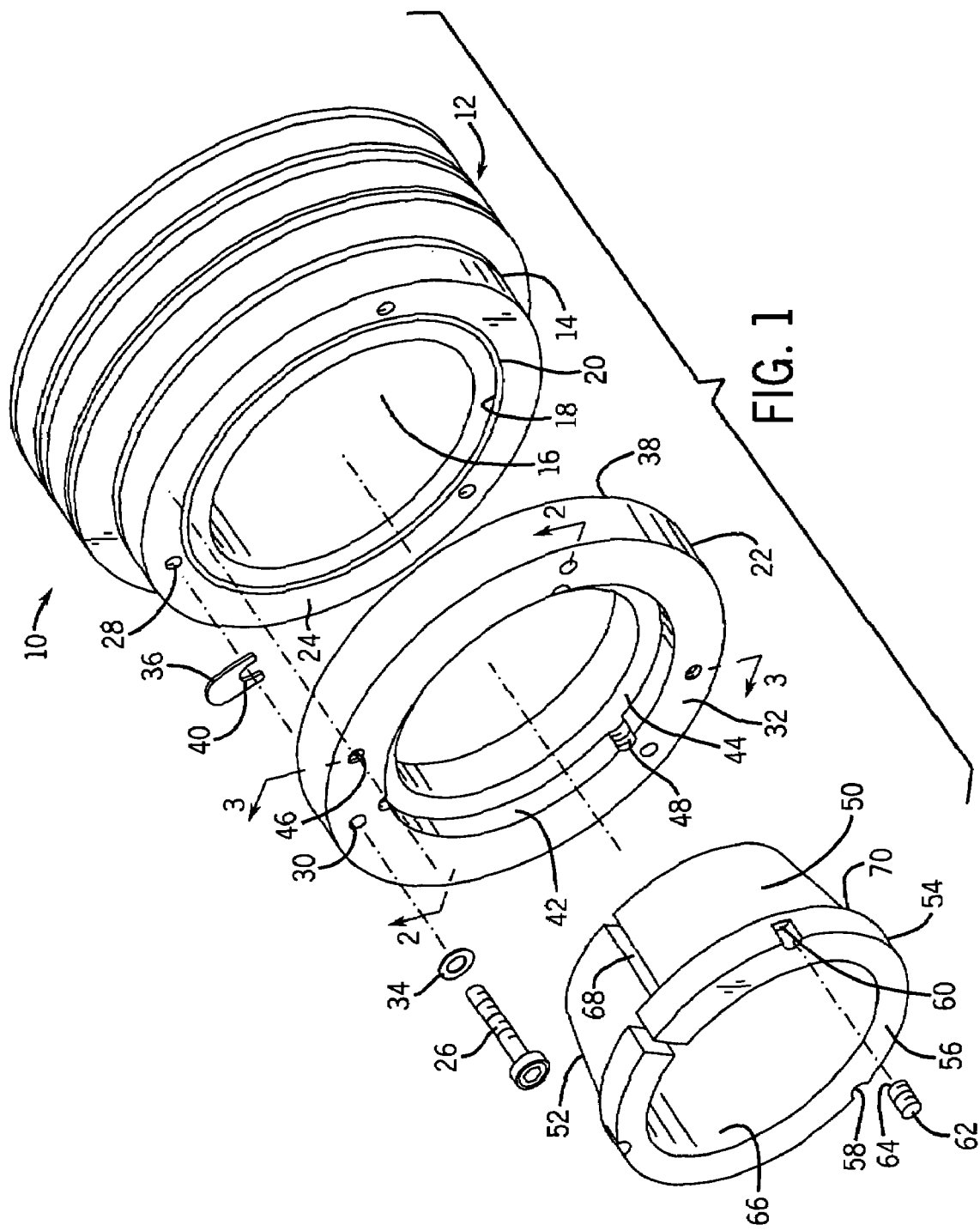
FIG. 1 is an exploded perspective view of the mounting system illustrating a bearing assembly, internal flange, external flange, tapered sleeve, and fasteners in a presently contemplated embodiment of the invention.

Turning now to the drawings, FIG. 1 illustrates the elements of a tapered sleeve mounting system in accordance with an exemplary embodiment of the invention. The system includes a bearing kit 10 comprising of a bearing assembly 12 and an internal flange 14. The bearing assembly 12 has a tapered inside diameter 16 and a guide diameter 18 to radially locate and mate with an internal diameter 20 of the internal flange. An external flange 22 is secured to a front face 24 of the internal flange via a plurality of fasteners 26 engaging threaded holes 28 located on the front face of the internal flange. Through holes 30 in the external flange allow the fasteners to pass through and load a front face 32 of the flange thereby clamping the parts together. A washer 34 may be used in conjunction with the fasteners to distribute the load on the front face. A spacer 36 is captured between the front face 24 of the internal flange 14 and a back face 38 of the external flange 22. The spacer is configured with an indention 40 that allows for it to be easily removed without the need to disengage the fastener from the internal flange.

The external flange 22 has a stepped inside diameter 42 that creates an internal load shoulder 44. The load shoulder 44 and threaded holes 46 in the external flange form a jack screw mechanism that is used to disengage the mounting system as discussed in more detail below with reference to FIG. 3.

Drive threads 48 are located on the inside diameter 42 of the external flange 26 and are used to urge the sleeve 50 to the initial position. As discussed above, the initial position is the point where tolerances and initial clearances between the mating parts have been removed. The sleeve has a tapered outside diameter 52 that engages the tapered insider diameter 16 of the bearing assembly 12. The outer portion of the sleeve transitions from the tapered outside diameter to a uniform outside diameter 54 near the front face 56 of the sleeve. It should be noted that the present system may be employed with components that are differently configured, particularly insomuch as the engaging tapers are concerned. For example, to avoid tapering the bearing ring itself, another sleeve may be interposed in the assembly that has a surface interfacing with the inner diameter of the inner bearing ring, and a tapered inner surface that contacts the tapered outside diameter of sleeve 50.

The front face 56 of the sleeve has a plurality of recesses 58 which form a front load surface 60. These recesses align with the drive threads 48 in the external flange 22. A plurality of screws 62 engage the drive threads 48 and recesses 58. The screws 62 further engage the sleeve 50 via the front load surface 60 formed by the recesses. This allows the tapered sleeve 50 to be driven into the bearing kit 10 thereby initially securing the bearing assembly to the shaft. The tapered sleeve has a uniform inside diameter 66 and an axial split 68 allowing it to clamp down on a circular shaft when the tapered diameters are driven together. The transition from the tapered diameter 52 to the uniform diameter 54 forms an extraction load face 70. This face is used to disassemble the parts via the jack screw mechanism as described below.

Figure 2:
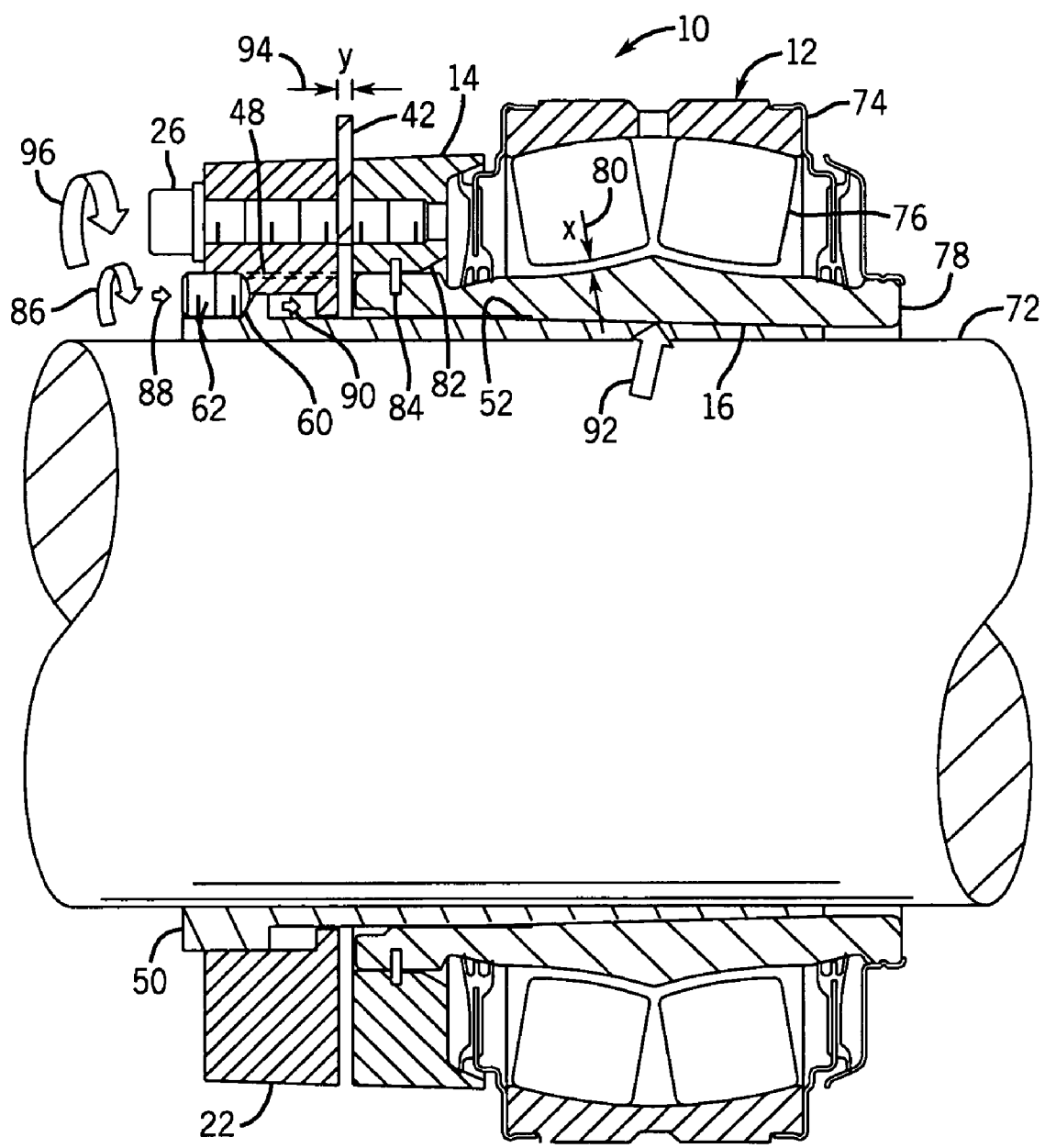
FIG. 2 is a sectional view of the mounting system of FIG. 1, sectioned along line 2-2, illustrating the process for mounting the bearing assembly onto a shaft using the innovative drive system.

FIG. 2 is a sectional view of the mounting system of FIG. 1, sectioned along line 2-2. The figure illustrates the procedure for mounting a bearing kit 10 on a shaft 72. A tapered bore spherical roller bearing is illustrated in the figure, but the present invention is not limited to these specific types of bearings or even bearings products in general. In general, the bearing assembly includes an outer ring 74, a roller set 76, and an inner ring 78. The bearing assembly has an internal clearance 80, labeled "x" in the figure. The internal clearance allows the user to initially position the assembly onto the shaft and may be decreased when the bearing is placed in service. This may be done by expanding the inner ring of the bearing assembly by means of the tapered sleeve. The internal flange 14 is also part of the bearing kit and is axially secured to the inner ring via a snap ring 84. The snap ring is compressed by an annular camming surface 82 allowing the internal flange to slide onto the inner race 78 up to the point where the ring springs into the snap ring groove.

The tapered sleeve 50 is then pressed into engagement between the inner ring 78 and the shaft by engaging the screws 62 into the drive threads 48 located in the external flange 22. Sets of drive threads are aligned with respective recesses located in the sleeve and allow the screws to completely engage the drive threads. A torque, as indicated by reference numeral 86, is applied to the screws, forcing them against the front load surface 60 and thereby axially loading the sleeve, as indicated by reference numeral 90, and urging it towards the bearing assembly. This drives the tapered diameters together and results in an expansion/compression force, represented by reference numeral 92, between the parts. Thus, these screws are used to drive the sleeve to the zero reference point or initial position, which as discussed above, is the position where the tolerances and initial clearance between the mating parts has been removed.

The user determines this initial position by monitoring the torque input, as indicated by reference numeral 86, into the screw and stopping once an empirically determined torque value has been reached. This may be done via a conventional torque wrench, and the initial position torque will typically be indicated by the manufacturer of the system, based upon the particular size and configuration of the bearing and other components. Those skilled in the art will appreciate that this point load drive system reduces frictional losses in the drive mechanism and allows the user to accurately determine and reliable quantify the initial position by monitoring the torque input to the screws. In other words, the invention reduces the uncertainty in the torque measurement by minimizing the impact of the variance in this resistance component. Furthermore, the invention does not require the user to overcome an excessive amount of frictional resistance, thereby making it easier to install the system. Also, a standard torque wrench is the only special tooling required, thus eliminating the need for other tooling or custom fixturing.

As discussed above, determining the initial position is useful because it represents the point where all of the tolerances and initial clearance between mating parts has been removed. Once this initial position has been determined, the user only needs to drive the sleeve a predetermined distance to properly reduce the internal clearance of the bearing, labeled "x", or otherwise fully engage the sleeve between the bearing and the shaft. One of the advantages of the present invention is that the width 94 of the removable spacer, labeled "y", is equal to the axial displacement required to drive the sleeve from the initial position to the proper final position. Thus, to easily remove the amount of internal clearance, the user only needs to remove the spacer 42 and apply a torque, represented by numeral 96, to the fastener 26, thereby shouldering the external flange against the internal flange. In doing this, the predetermined displacement "y" is directly transferred to the sleeve via the drive screw interaction described above. Thus, the exact amount of radially expansion required to reduce the internal clearance of the bearing, or the tight engagement of the sleeve between the bearing and shaft is automatically and precisely set by simply mating the two flanges.

The screws 62 may remain in place during operation and help to ensure the sleeve does not disengage the bearing assembly by keeping a constant load on the front load surface. The screws also serve to key the parts together by rotatably locking the internal flange 14, external flange 26, tapered sleeve 50, and inner race 78. This prevents any relative motion between these parts that could otherwise generate frictional heat and lead to eventual failure or unscheduled maintenance of the system.

Figure 3:
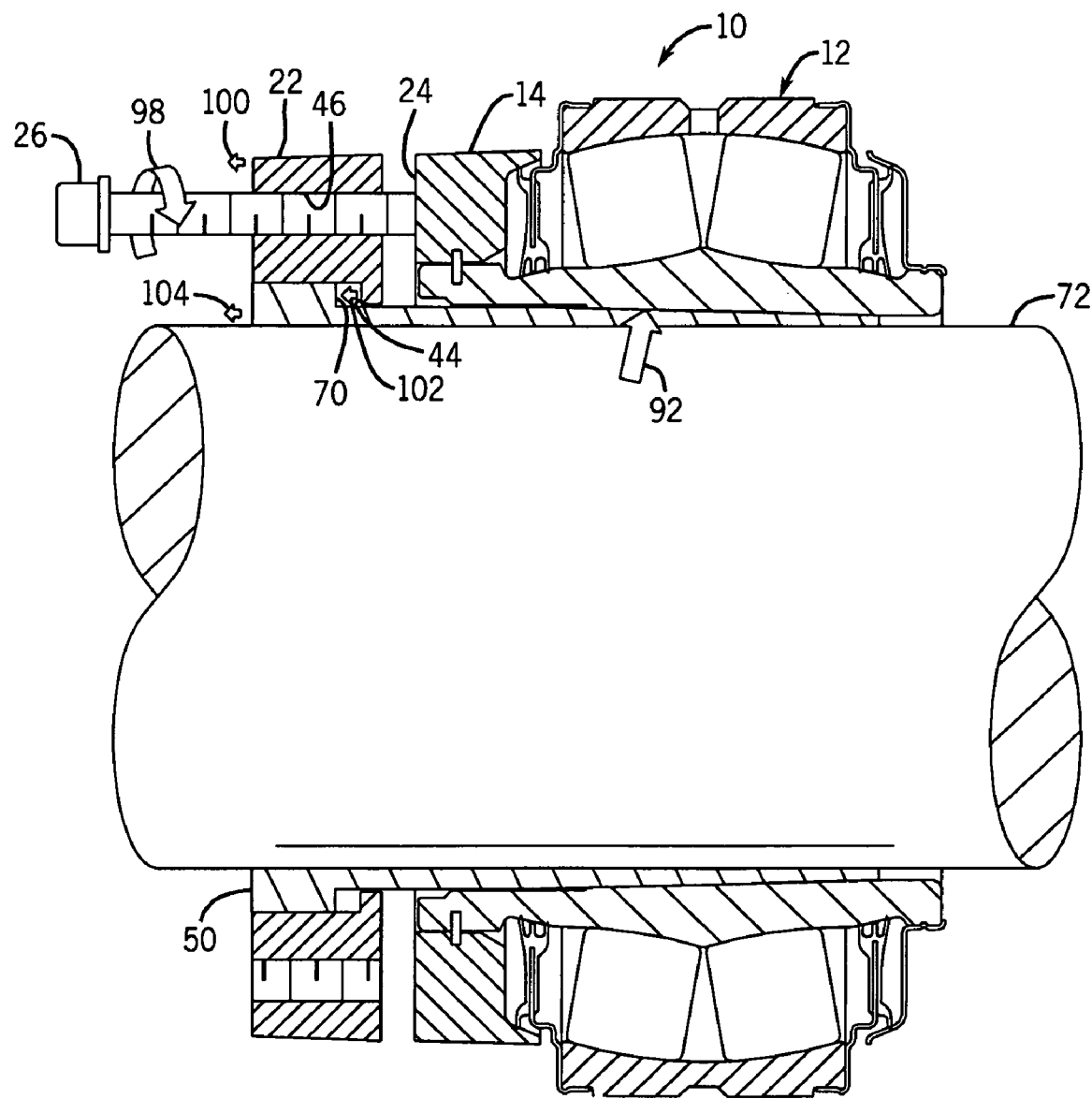
FIG. 3 is a sectional view of the attachment system of FIG. 1, sectioned along line 3-3, illustrating the process for dismounting the bearing assembly from the shaft via the jack screw mechanism.

FIG. 3 is a sectional view of the mounting system of FIG. 1, sectioned along line 3-3. The figure illustrates the procedure for disassembling the bearing kit 10 from the shaft 72 using the jack screw mechanism. For this procedure the fasteners 26 are removed from the internal flange 14 and then torqued into the threaded holes 46 located in the external flange 22, as indicated generally by reference numeral 98. The parts are configured so that the fasteners load a solid portion of the internal flange thereby driving the external flange away from the internal flange, as indicated by reference numeral 100. During this process, the axial movement of the external flange is transferred to the sleeve 50 via loading of the extraction load face 70 by the internal load shoulder 44, as indicated by reference numeral 102. The result is that the sleeve 50 is driven out of the bearing kit 10, as indicated by reference numeral 104, thereby disengaging the mounting system. Thus, the user only needs a wrench to quickly and efficiently dismount the mechanical elements from the shaft. This increases productivity and allows for greater flexibility for the personnel and surrounding environment required to service the mounted element.

Finally, as mentioned throughout the present discussion, the present mounting system is not limited to bearing assemblies and may be used to mount other mechanical elements to a shaft. For example, the system may serve to mount mechanical couplings used to couple one shaft to another. To complete this coupling a mechanical element (typically a coupling "half") is directly mounted to the shaft. The present system may be used to mount this type of element, and many others, directly to a shaft offering all of the same benefits and advantages described above.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for mounting a bearing assembly on a shaft, comprising:
    engaging a tapered sleeve to a first position between the bearing assembly and the shaft by engagement of a plurality of screws between the sleeve and an external flange, the external flange surrounding the shaft;
    removing a removable spacer disposed between the external flange and an internal flange axially secured to the bearing assembly; and
    engaging a plurality of fasteners between the external flange and the internal flange to force the sleeve from the first position to a final position.

2. The method of claim 1, wherein the external flange has a plurality of threaded recesses for receiving the screws, and the sleeve has a plurality of non-threaded recesses disposed to be aligned with the threaded recesses for receiving the screws.

3. The method of claim 1, comprising limiting engagement of the sleeve when a predetermined torque is applied to the screws.

4. The method of claim 1, wherein the spacer has a thickness equal to a distance between the first position and the final position.

5. The method of claim 1, comprising leaving the screws engaged between the sleeve and the external flange to prevent relative rotation of the external flange and sleeve during operation.

* * * * *